United States Patent [19]
Johnson et al.

[11] Patent Number: 6,023,254
[45] Date of Patent: Feb. 8, 2000

[54] PROJECTION SYSTEM FOR A COMPUTER

[75] Inventors: Earnest J. Johnson, Mesa; Christopher K. Y. Chun, Gilbert; Barbara M. Foley, Phoenix; Daniel B. Schwartz, Apache Junction; Douglas P. Fayden, Tempe, all of Ariz.; Cary D. Perttunen, Shelby Township, Mich.

[73] Assignee: Motorola, Inc., Schaumburg, Ill.

[21] Appl. No.: 08/798,203

[22] Filed: Feb. 10, 1997

[51] Int. Cl.[7] ........................................... G09G 3/00
[52] U.S. Cl. ............................................. 345/32; 345/905
[58] Field of Search ................ 345/32, 905; 348/745, 348/746; 349/5, 6

[56] References Cited

U.S. PATENT DOCUMENTS

| | | | |
|---|---|---|---|
| 4,294,524 | 10/1981 | Stolov | 345/32 |
| 5,200,815 | 4/1993 | Tsujihara et al. | 348/745 |
| 5,260,797 | 11/1993 | Muraji et al. | 348/745 |
| 5,426,471 | 6/1995 | Tanaka et al. | 348/76 |
| 5,471,054 | 11/1995 | Watanabe | 250/231.13 |
| 5,877,745 | 3/1999 | Beeteson et al. | 345/156 |

*Primary Examiner*—Richard A. Hjerpe
*Assistant Examiner*—Anthony J. Blackman
*Attorney, Agent, or Firm*—James E. Gauger; Jeffrey G. Toler

[57] ABSTRACT

A projection system for a computer has an electronic slide (94) that is coupled to an electronic image signal (84) from a processor (82) in the computer (50). Projection optics (102) focus an optical image from the electronic slide (94) onto a screen (58).

14 Claims, 6 Drawing Sheets

PROJECTION SYSTEM FOR A COMPUTER

FIELD OF THE INVENTION

The present invention relates generally to the field of display devices for computers and more particularly to a projection system for a computer.

BACKGROUND OF THE INVENTION

Portable computers, such as a particular example of a portable computer 10 shown in FIG. 1, are generally formed of two sections: a processor section 12 and a display section 14 (See FIG. 1). The processor section 12 has a keyboard 16 and a mother board 18. The mother board 18 typically contains the memory, logic and microprocessors necessary to run the computer 10. The display section 14 contains a display 20, which is typically a Liquid Crystal Display (LCD) or a gas plasma display. The display 20 is often heavy requiring a heavy duty hinge 22 to connect the display section 14 to the processor section 12. In addition, the heavy duty hinge 22 holds the display 20 in a position the user finds comfortable for viewing. The display 20 is driven by the mother board processor and is connected to the mother board 18 by a ribbon cable 24. The ribbon cable 24 has to be flexible enough to fit through the hinge 22. Graphics intensive software packages have increased the data rates between the mother board 18 and the display 20, resulting in heavier and bulkier ribbon cables 24. Portable computer manufacturers continually work on making lighter and thinner displays 20 and desire to reduce the weight and size of the display section 14.

Thus there exists a need for a display that addresses the problems associated with using a ribbon cable and that is light weight and small.

DETAILED DESCRIPTION OF THE DRAWINGS

Generally, the invention provides a projection system for a computer. The projection system eliminates the need for the ribbon cable between the processor section and the display section. The display is replaced with a screen that is lighter and smaller than a conventional display. The projection system may have an electronic slide that is coupled to an electronic image signal from a processor in the computer and may have a projection optics device that focuses an optical signal from the electronic slide onto the screen.

Figure 1:
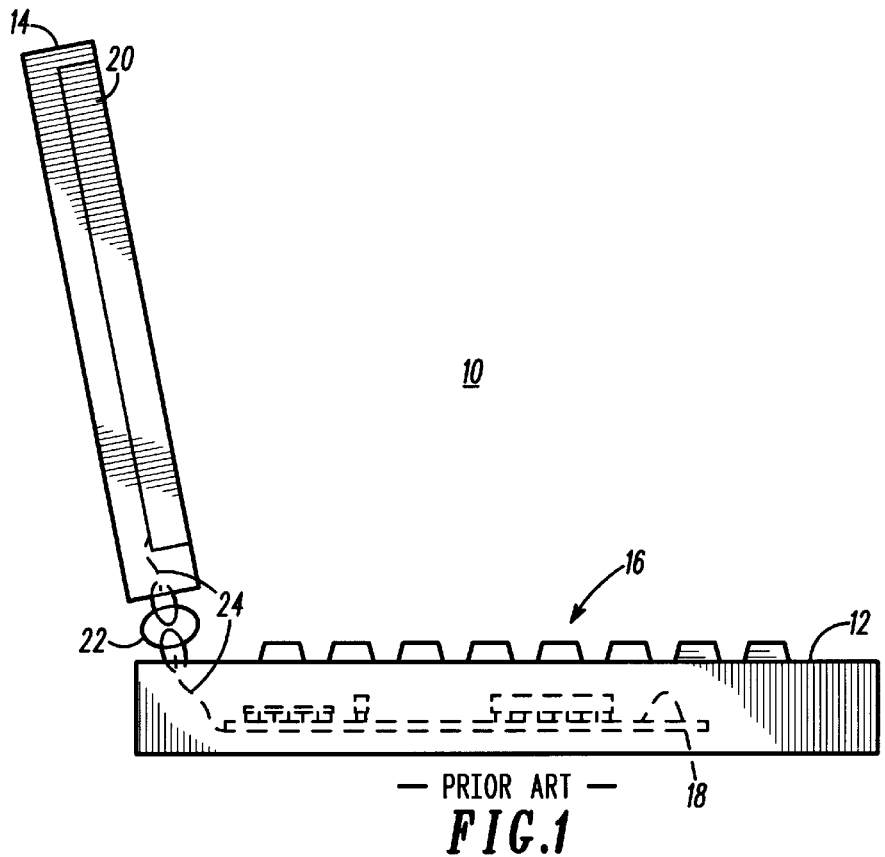
FIG. 1 is a prior art design of a portable computer.
Figure 2:
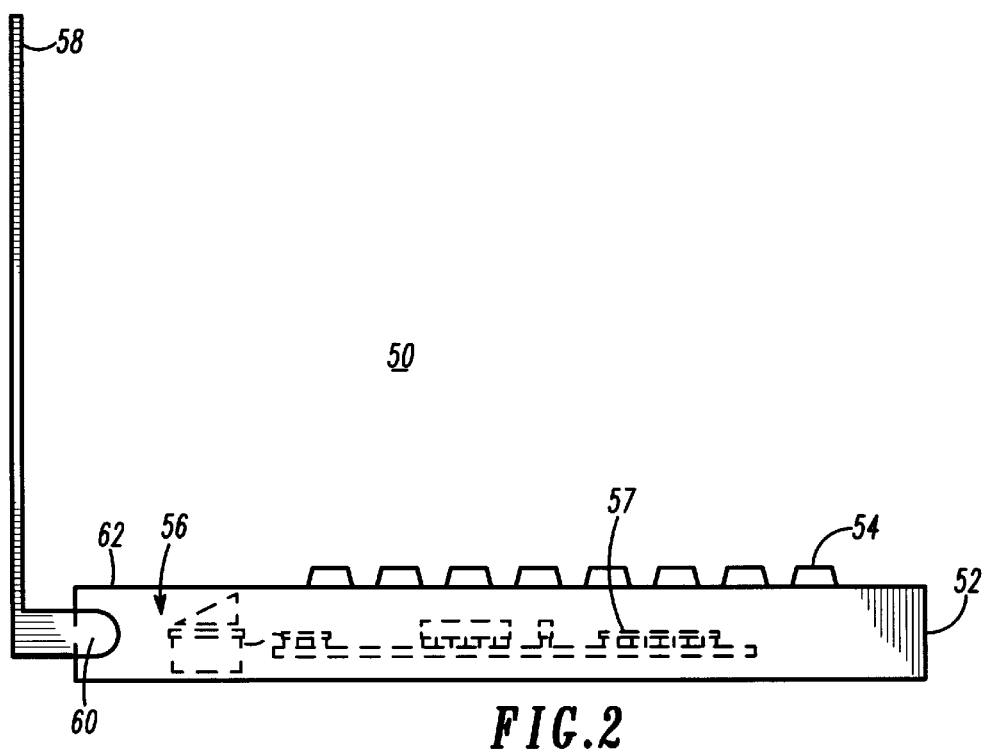
FIG. 2 is a general diagram of a portable computer with a projection system according to an embodiment of the invention.

FIG. 2 illustrates a portable computer 50 with a projection system according to an embodiment of the invention. The portable computer 50 has a housing 52 with a keyboard 54 on a surface of the housing 52. In one embodiment the keyboard 54 is an ergonomic keyboard. A projection system 56, coupled to a mother board 57 inside the housing 52, can be placed between the two hand positions when an ergonomic keyboard is used, allowing the projection system 56 to be further away from a screen 58. The keyboard 54 and the projection system 56 are electrically connected to the mother board 57. In this embodiment, the screen 58 is connected to the housing 52 by a hinge 60. A window 62 disposed in a surface of the housing 52 provides optical access to the screen 58 for the projection system 56.

Figure 3:
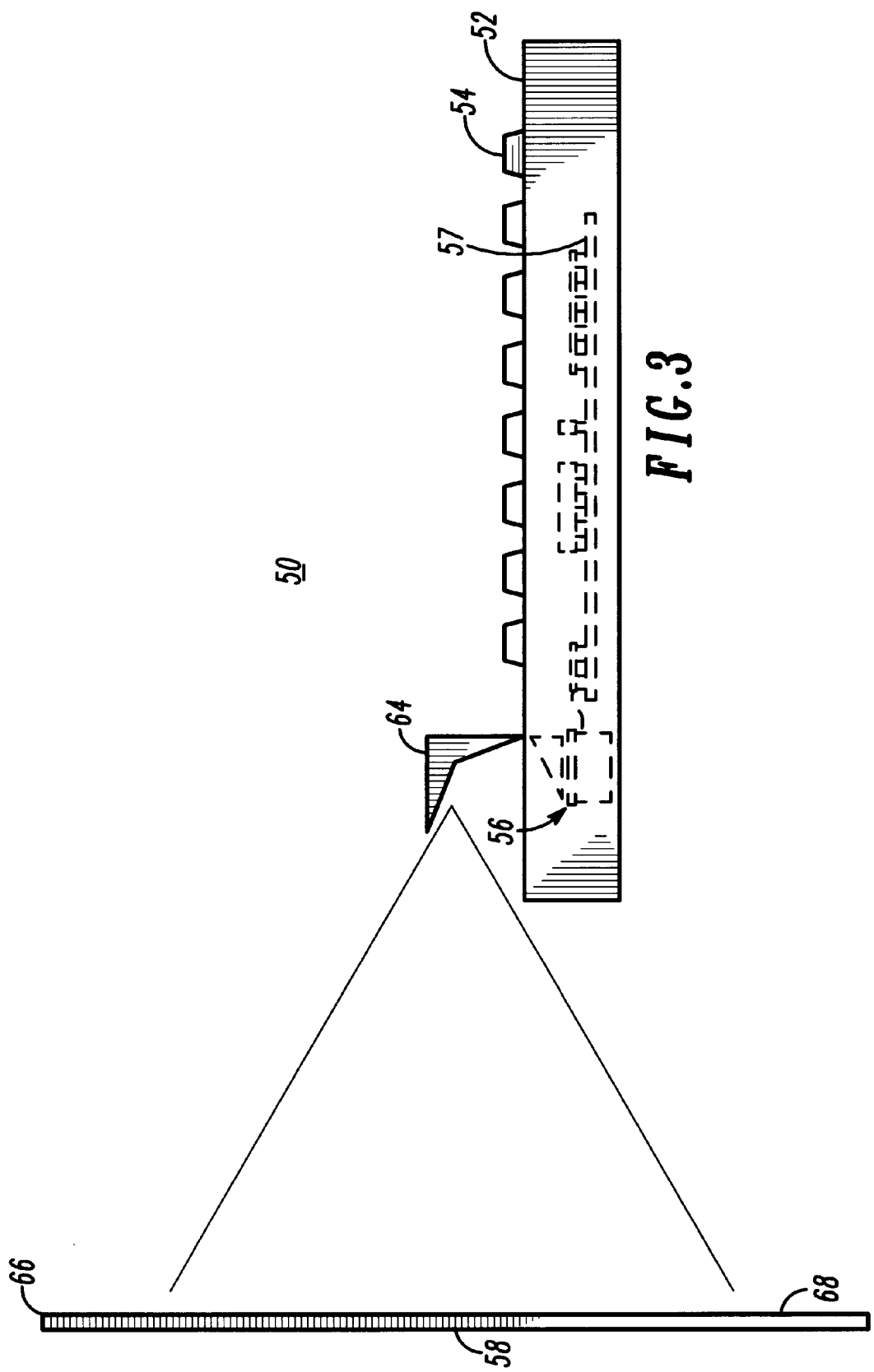
FIG. 3 is a general diagram of another embodiment of a portable computer with a projection system according to the invention.

FIG. 3 is similar to FIG. 2 except the screen 58 is detached from the computer 50. In this embodiment additional optics 64 are provided as an attachment to the computer 50 to allow for projection onto a detached screen 58.

Figure 4:
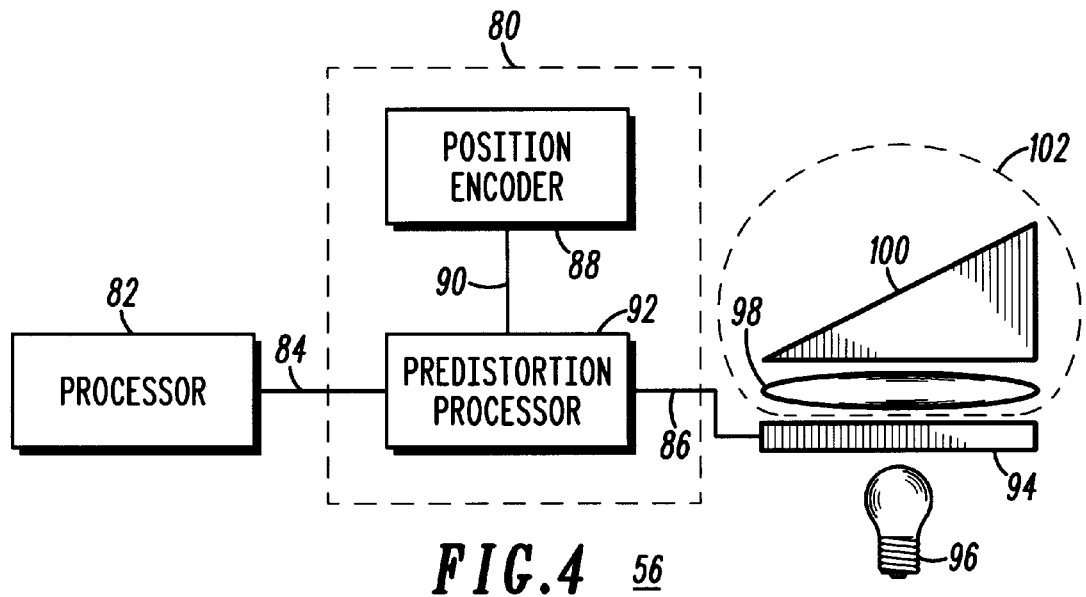
FIG. 4 is a block diagram of a projection system.

FIG. 4 is a block diagram of an embodiment of the projection system 56. The projection system 56 includes a distortion correction system 80, a processor 82, an electronic slide 94, and a projection optics device 102. The processor 82, which is preferably contained in the mother board 57, sends an electronic image signal 84 to the distortion correction system 80. The electronic image signal 84 is preferably an output signal the processor 82 would have sent to a standard display in a portable computer. The distortion correction system 80 performs a mathematical transform on the image signal 84 to form a predistorted image signal 86. The predistorted image signal 86 is predistorted so that distortion caused by the optical image traveling to the top of the screen 58 is counter balanced by the predistortion. As a result, the image projected onto the screen 58 appears as the image would appear on a computer display. Distortion on the edges of the screen 58 is also corrected by the distortion correction system 80.

The distortion correction system 80 includes a position encoder 88 that sends a position signal 90 to a predistortion processor 92. The predistortion processor 92 performs the mathematical transformation on the image signal 84. The amount of distortion correction is dependent on the position of the screen 58. For instance, if the screen 58 is tilted back instead of vertical, the distortion correction routine is altered. A distortion free projection system would have all points on the screen equidistant from the projector. As a result the screen would be a portion of a sphere. Mathematically, this can be simulated by altering an image on an electronic slide 94 to be a projection onto a flat plane of the image on the portion of the sphere. This algorithm can be performed by the processor 82 or can be performed by a Digital Signal Processor (DSP).

Referring to FIGS. 7–10, a particular method that may be programmed into predistortion processor 92 to project onto an image screen that is tilted at an arbitrary angle relative to the optic axis of the projector will now be described. When the optical axis of the projector optics is not normal to the screen on which an image is projected optical distortions in the image on the screen occur, such as that: 1) the image is not uniformly focused along the screen, 2) the magnification is not uniform along the screen, and 3) the intensity is not uniform along the screen. A method to compensate for these distortions by using predistortion in the object space will now be described.

Figure 7:
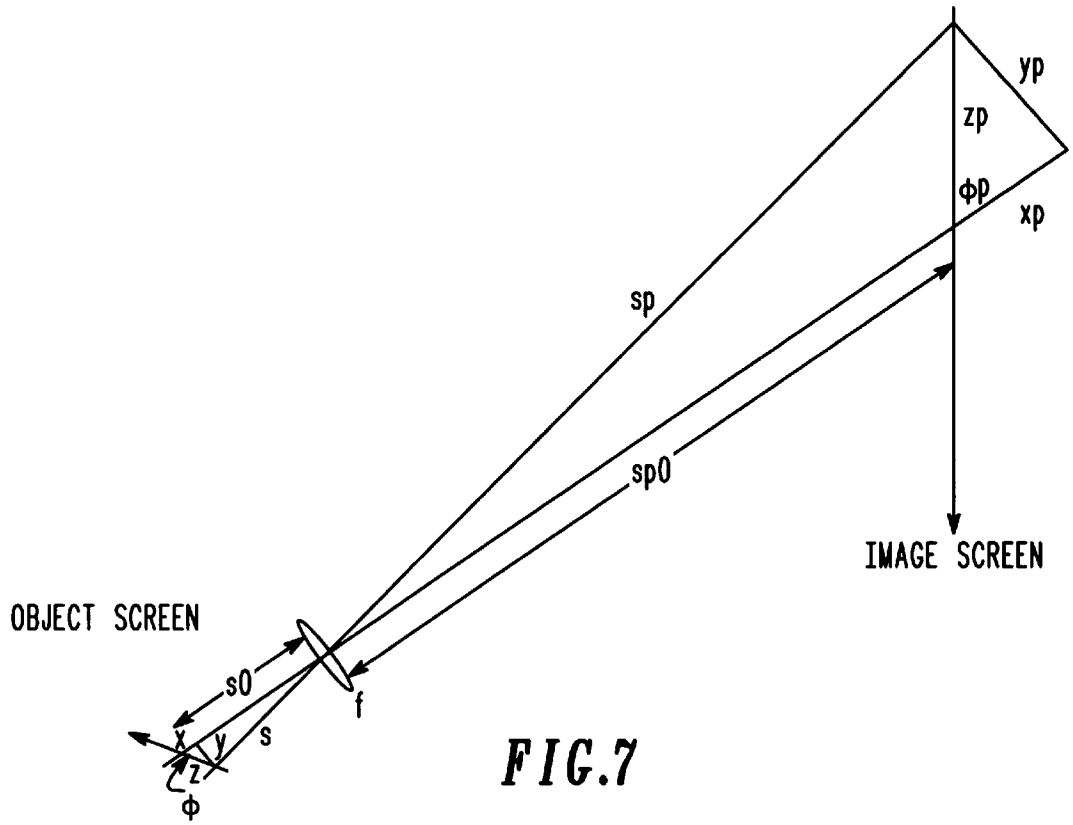
FIGS. 7–10 illustrate a method of determining distortion for use by the predistortion processor of FIG. 4.

In an example optical geometry shown in FIG. 7, information from a computer, such as computer 50, is displayed on an object screen somewhere inside the computer chassis. Optics form an expanded image of this display on an image screen external to the computer chassis, such as screen 58.

An angle $\phi p$ is the angle between an optical axis of the projection optics and a plane of the image screen. In the diagram the image screen is shown as being vertical, but this isn't essential to the analysis.

The optic axis corresponds to an image (e.g. letters) in the center of the screen, and a line sp0 corresponds to the image distance of that image. All images on a horizontal line have approximately the same image distance. With respect to variations in the vertical direction on the screen, an arbitrary image has the image distance sp at an angle θ to the optical axis. One can then calculate the variation of the image distance over some range of θ that covers the screen by the equation:

$$sp := spo \cdot \frac{1}{\cos(\theta)} \cdot \left(1 + \frac{\tan(\theta)}{\tan(\theta p) - \tan(\theta)}\right)$$

The set of object distances for sharpest focus is given by:

$$s := \frac{sp \cdot f}{sp - f}$$

where f is the focal length of the projection optics.

Figure 8:
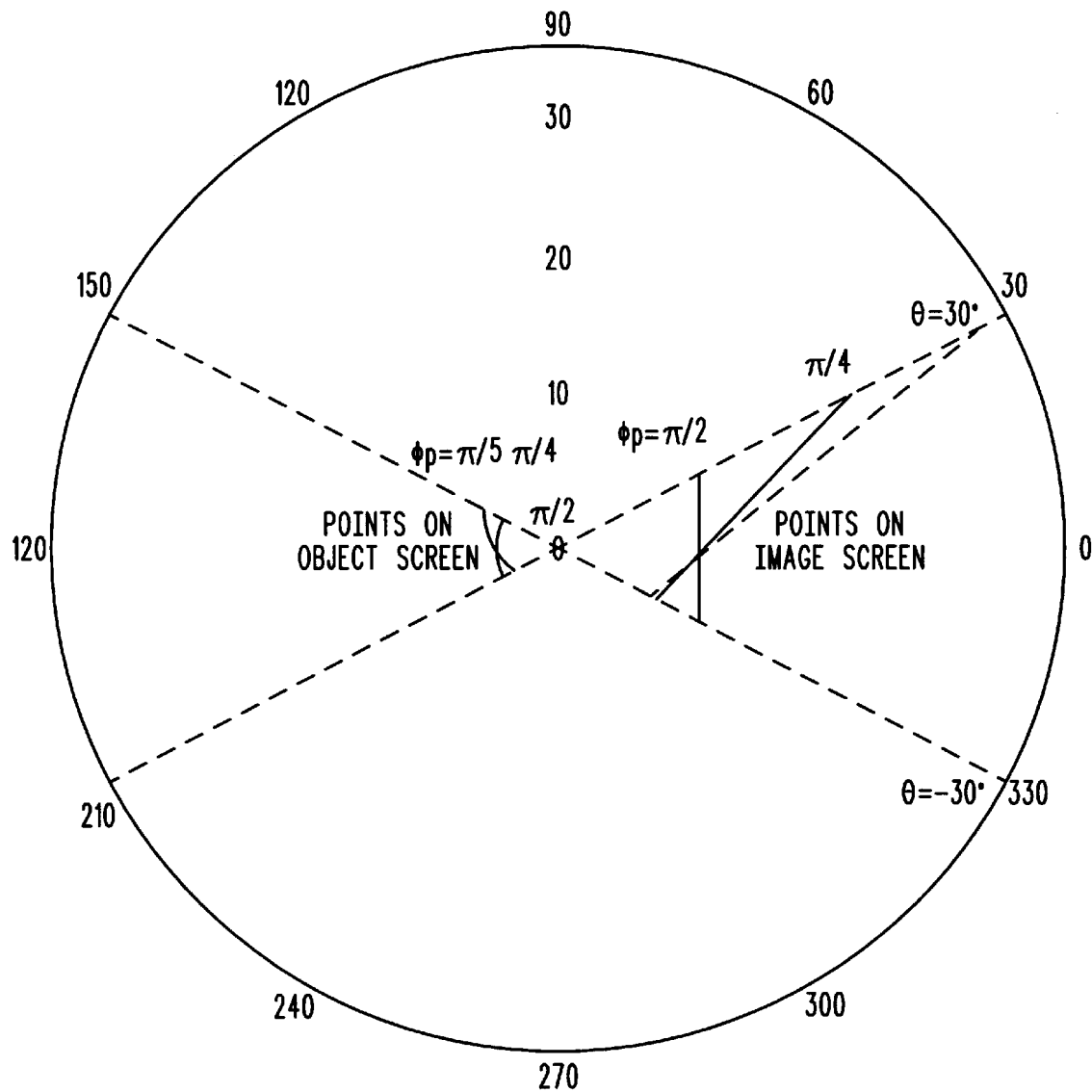

The results of the calculations for θ varying over a range of +/−30° is shown in FIG. 8. The images on the image screen are flat, but the calculated object points are curved. If the object screen had such a curvature the images would be in sharp focus on the image screen.

The tilt angles φ in the object space, defined in FIG. 7, vary with θ and can be calculated by:

$$\phi := a \tan\left(\frac{\sin(\theta)}{\cos(\theta) - \frac{s0}{s}}\right)$$

Figure 9:
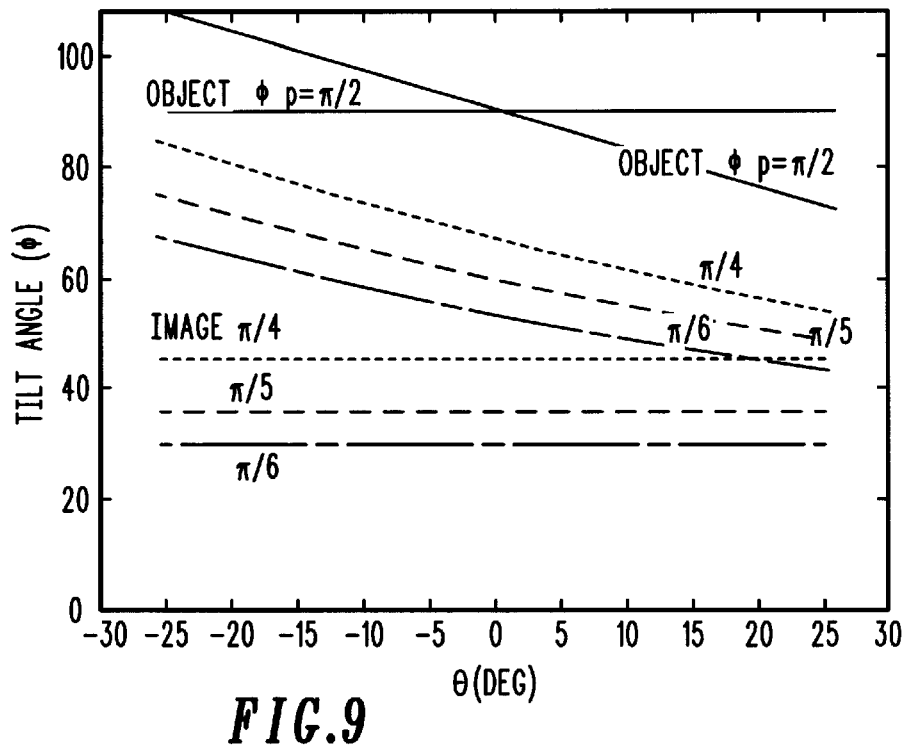

The calculated values for the tilt angles are shown in FIG. 9.

With a warped object screen the images are sharply focused on the image screen. However, the magnification varies across the image screen. The opposite magnification needs to occur on the lines across the object screen. The magnifications occurring in the optical system can be calculated according to:

$$m := \frac{sp}{s}$$

Figure 10:
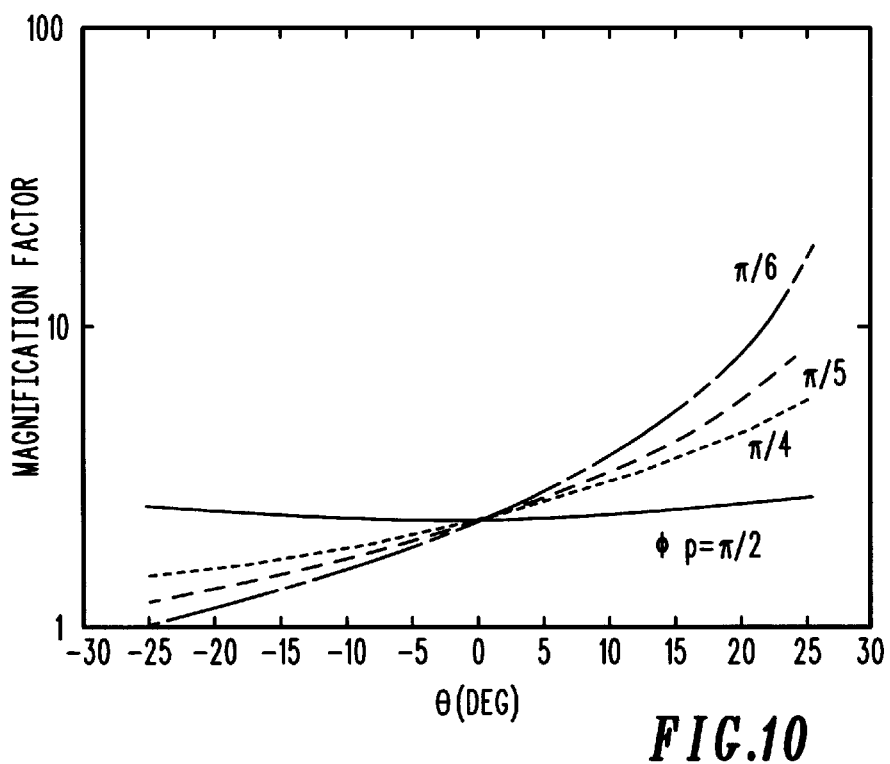

These values are given in FIG. 10.

To adjust for these distortion considerations, an object screen that can be tilted at an arbitrary angle to the optical axis of the projector, and whose letter size and intensity varies across the screen is proposed. Although the ideal screen would be warped, to be practical the screen should be flat, but tilted at an angle as determined by the tilt of the image screen, such as the geometry shown schematically in FIG. 7.

In the conventional projection system where the screens are normal to the optic axis, both the object screen and the image screen are flat, and a user's eyes do not perceive a problem even though mathematical calculations indicate that the object screen should be curved. The calculations in FIG. 9 show that variations in the tilt angle over about 30° can be tolerated by a user so that the warp is unnecessary. The desired tilt angle in the object space for a given tilt in the image space is the average of those shown for each case in FIG. 9. This would be the tilt angle at θ=0. These values are given in Table 1.

TABLE 1

| Tilt in image space | Required tilt in object space |
|---|---|
| π/2 | 90 deg |
| π/4 | 68 deg |
| π/5 | 60 deg |
| π/6 | 55 deg |

The magnification should preferably be digitally programmed, such as in processor 92, to vary vertically along the object screen inversely as given in FIG. 10. The intensity likewise should preferably be programmed to vary as the magnification to compensate for optical distortion by predistortion.

Referring again to FIG. 4, the position encoder 88 can be a sophisticated encoder on the hinge 60 of the screen 58, or the screen 58 can be constrained to one of several locked positions. These positions could be detected by a standard position sensor and the position signal sent to the predistortion processor 92. In another embodiment the position encoder 88 could be input by the user, such as via keyboard 54.

The electronic slide 94 is a Liquid Crystal Display (LCD panel) in one embodiment. A light source 96 shines light through the electronic slide 94 to form an optical signal. The optical signal then passes through a focusing optics device 98 and is directed onto the screen 58 by a projection prism 100. The focusing optics device 98 and the projection prism 100 together comprise a projection optics device 102 and the screen 58 receives the output of the projection optics device 102.

Figure 5:
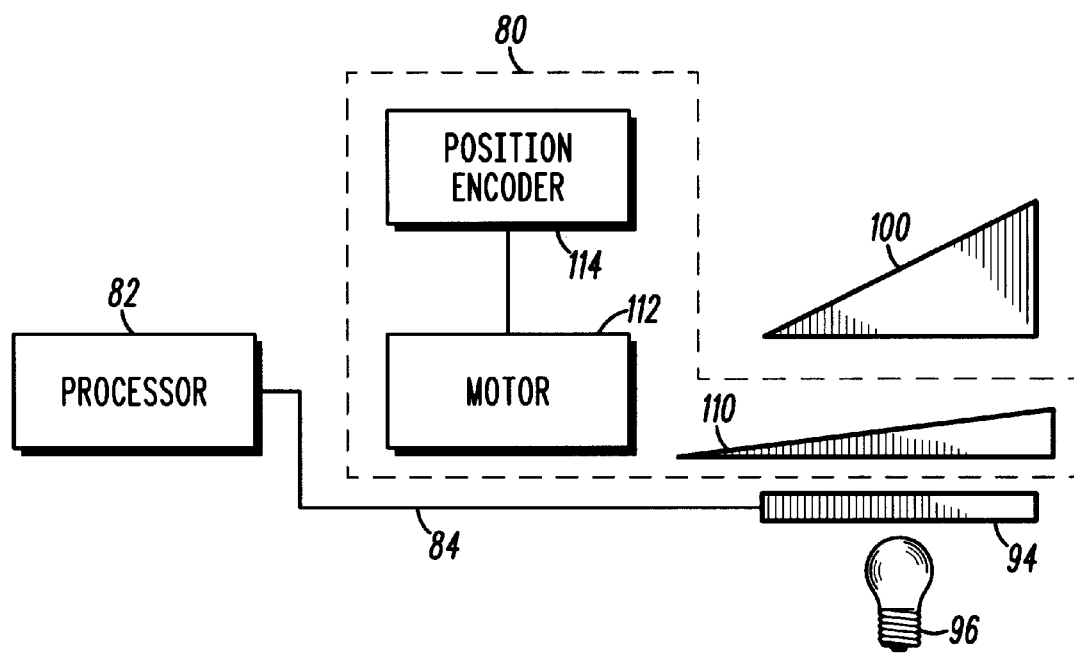
FIG. 5 is a block diagram of another embodiment of the projection system of FIG. 4.

FIG. 5 is a block diagram of another embodiment of the projection system 56. In this embodiment a distortion correction system 80 uses an optical correction element 110 to form a predistorted optical signal, that performs the distortion correction. The optical correction element 110 is formed so that as the screen 58 is pivoted the optical correction element 110 is moved over an electronic slide 94 to provide the correct distortion. The optical correction element 110 in one embodiment rotates the image plane to correspond to the plane of the screen 58. In another embodiment the optical correction element 110 includes two or more optical elements. One of the optical elements corrects for distortion in the horizontal plane and a second optical element corrects for distortion in the vertical plane.

A third optical element can be added to correct for rotation of the screen 58. The horizontal and vertical optical correction elements should be selected so that the effective path length to the middle of the screen substantially equals the optical path length to the edges of the screen, without causing the optical rays to bend. In one embodiment the optical element for correcting the horizontal and vertical distortion is formed by rings of glass having surfaces perpendicular to an optical axis of the projection system 56. The optical element used to rotate the image plane may be adjusted by a motor 112. The motor 112 is controlled by a position encoder 114. The position encoder 114 determines the location of the screen 58 and includes a processor that calculates a desired movement of the optical correction element 110, which is then effected by the motor 112.

Figure 6:
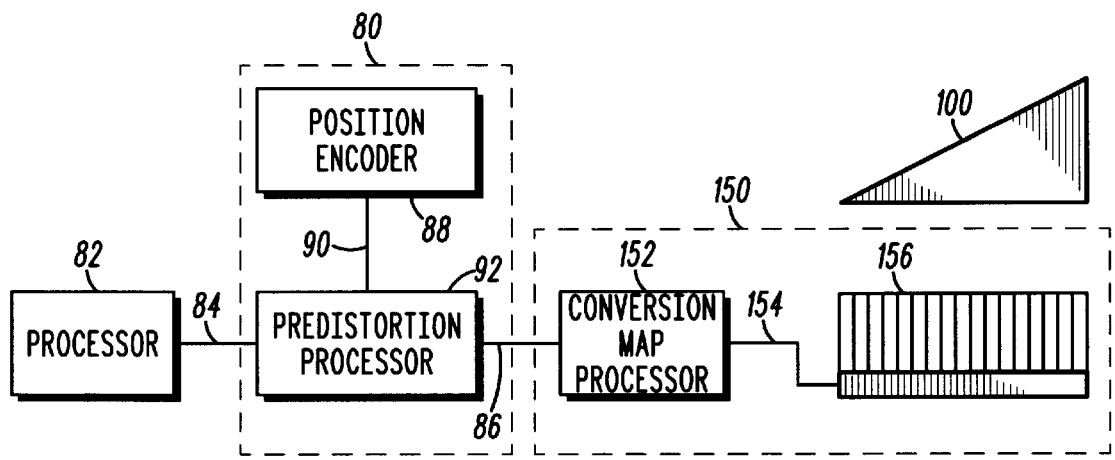
FIG. 6 is a block diagram of another embodiment of the projection system of FIG. 4.

FIG. 6 is a block diagram of another embodiment of the projection system 56. In this embodiment an optical phased array system 150 scans a light beam over the screen 58 to trace out the image. In the optical phased array system 150, the phase and amplitude of individual emitters are controlled to direct an optical beam. An electronic image signal 84 is predistorted by the distortion correction system 80 to produce a predistorted image signal 86. The correction system 80 includes a position encoder 88 and a predistortion processor 92. The predistorted image signal 86 is transmitted to the optical phased array system 150. The optical phased array system 150 has a conversion map processor (optical phase array driver) 152 that converts the predistorted image signal 86 into a phase and intensity signal 154. The phase and intensity signal 154 drives an optical phased array antenna 156. The optical phased array antenna 156 then emits, at its output, the appropriate phase and amplitude from each of the individual emitters to form a scanning beam that traces out the image.

Thus, there has described a projection system for a computer that reduces problems associated with using a ribbon cable, has a small size and is lightweight. The embodiments of the invention have been described for use with a portable computer, however it can be used with any computer. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A portable computer comprising:

a housing having a keyboard disposed therein;

a mother board in communication with the keyboard and contained in the housing;

a projection system contained in the housing and electrically coupled to the mother board, wherein the projection system includes a distortion correction system having a motor; and a screen pivotally attached to the housing.

2. The portable computer of claim 1, wherein the housing includes a window in its surface.

3. The portable computer of claim 1, wherein the keyboard is an ergonomic keyboard.

4. The portable computer of claim 1, wherein the distortion correction system includes a predistortion processor.

5. The portable computer of claim 4, wherein the distortion correction system includes a position encoder that transmits a position signal to the predistortion processor.

6. The portable computer of claim 1, wherein the distortion correction system includes a position encoder coupled to the motor.

7. A projection system for a computer comprising:

a processor within a housing of the computer;

a distortion correction system including a motor responsive to the processor;

an electronic slide receiving a distortion corrected signal and producing an optical signal;

a projection optics device receiving the optical signal from the electronic slide and producing an output; and a screen receiving the output of the projection optics device, wherein the electronic slide is an LCD panel.

8. The projection system of claim 7, further comprising a predistortion processor receiving an electronic image signal from the processor and transmitting a predistorted image signal to the electronic slide.

9. A projection system for a computer comprising:

a processor within a housing of the computer;

a distortion correction system including a motor responsive to the processor;

an electronic slide receiving a distortion corrected signal and producing an optical signal;

a projection optics device receiving the optical signal from the electronic slide and producing an output;

a screen receiving the output of the projection optics device;

a predistortion processor receiving an electronic image signal from the processor and transmitting a predistorted image signal to the electronic slide; and a position encoder coupled to the predistortion processor.

10. The projection system of claim 7, wherein the distortion correction system receives an optical signal and transmits a predistorted optical signal to the projection optics device.

11. The projection system of claim 10, further comprising a position encoder having a position signal coupled to the distortion correction system.

12. A projection system for a computer comprising:

a processor within a housing of the computer;

a distortion correction system responsive to the processor;

a position encoder having a position signal coupled to the distortion correction system;

an electronic slide receiving a distortion corrected signal and producing an optical signal;

a projection optics device receiving the optical signal from the electronic slide and producing an output; and a screen attached receiving the output of the projection optics device, wherein the distortion correction system receives an optical signal and transmits a predistorted optical signal to the projection optics device and includes a motor that aligns a corrective imaging element based on the position signal.

13. The projection system of claim 7, wherein the screen is attached to the computer.

14. A projection system for a computer comprising:

a processor within a housing of the computer;

a distortion correction system responsive to the processor;

an electronic slide receiving a distortion corrected signal and producing an optical signal;

a projection optics device receiving the optical signal from the electronic slide and producing an output;

a screen receiving the output of the projection optics device; and a position encoder coupled to a hinge of the screen.

* * * * *